May 16, 1967   K. G. KREUTER   3,320,388
COMBINATION BIMETAL THERMAL SWITCH MOUNTED IN BETWEEN
A ROD AND TUBE THERMAL RESPONSIVE DEVICE
Filed Dec. 30, 1965

INVENTOR
KENNETH G. KREUTER

BY Anthony A. O'Brien
ATTORNEY

United States Patent Office 3,320,388
Patented May 16, 1967

3,320,388
COMBINATION BIMETAL THERMAL SWITCH
MOUNTED IN BETWEEN A ROD AND TUBE
THERMAL RESPONSIVE DEVICE
Kenneth Gilbert Kreuter, Goshen, Ind., assignor to Robertshaw Controls Company, Richmond, Va., a corporation of Delaware
Filed Dec. 30, 1965, Ser. No. 517,592
5 Claims. (Cl. 200—137)

This invention relates to a thermostatic switch and, in particular, to such a switch integrated with a normal temperature control to function as an abnormal temperature control.

Conventional thermostatic devices have approached the problem of excessive temperatures by utilizing abnormal temperature responsive means separate and distinct from the normal temperature responsive means. Such devices are encumbered with many disadvantages such as high cost and separate locations so that the two temperature sensors do not respond to a single ambient temperature condition and thus there is no true indication of an excessive temperature at the normal temperature sensing means.

It is, therefore, an object of the present invention to construct a low cost, accurate thermostatic device capable of responding to normal and abnormal temperatures.

Another object of this invention is to integrate a thermostatic switch with a rod and tube thermostat in such a manner that the switch leads are disposed on the same side of the rod and tube.

The present invention has another object in that a rod and tube thermostat includes an abnormal temperature responsive switch means having unitary leads and contacts.

A further object of the present invention is to utilize unitary wire leads, contacts and actuating means in an abnormal temperature responsive switch that is incorporated in a normal temperature responsive device.

In practicing the present invention, a thermal responsive device is provided with first temperature sensor means in the form of a rod and tube thermostat and second temperature responsive means in the form of bimetal switch means in an annular enclosure which is of heat conductive material disposed between the rod and tube in surface contact with the tube, and wherein the switch means includes contacts and leads that are integrally formed from wire leads.

Other objects and advantages of the present invention will become apparent from the following description taken in connection with the accompanying drawing wherein.

Figure 1:
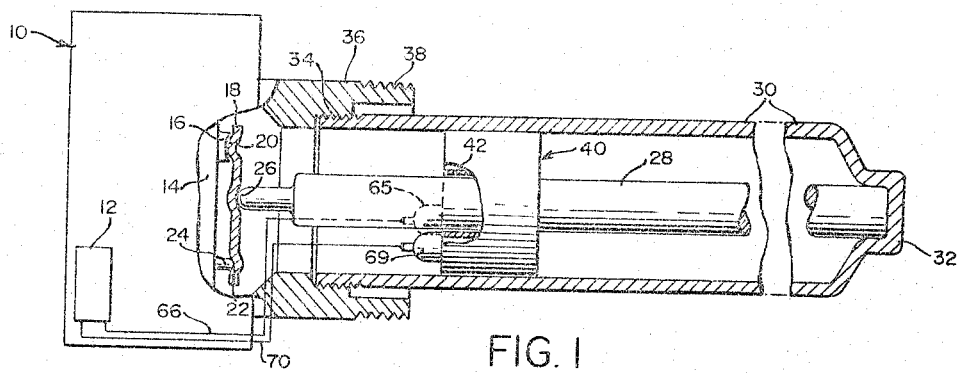
FIG. 1 is a side elevation with parts broken away and parts in section of a control device embodying the present invention.
Figure 2:
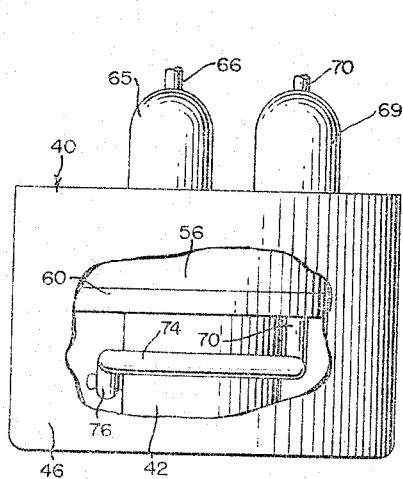
FIG. 2 is an elevation view with a part broken away of the thermostatic switch of FIG. 1 rotated 90°.

As is illustrated in FIG. 1, the present invention is embodied in a control device, indicated generally at 10, and having an abnormal temperature control 12 and a normal temperature control 14. The normal temperature control 14 includes an operating button 16 which is moved between controlling positions by a lever 18. One end of lever 18 has an abutment 20 engaging the operating button 16 and an opposite end with an abutment 22 engaging the end of a temperature selection shaft 24; the shaft 24 is moved axially by any suitable means, such as a manual dial (not shown) whereby the lever 18 is correspondingly positioned through a selective range of temperature settings. Intermediate its ends and on the side opposite the abutment 20 and 22, the lever 18 has a recess 26 which receives the rod end of a rod and tube type thermostat.

The thermostat unit for actuating the lever 18 includes a rod 28 of relatively non-expandable material, such as Invar, disposed within a tube 30 of relatively expandable material, such as copper. The free ends of the rod 28 and the tube 30 are integrated by any suitable means such as a closed welded end portion 32. The mounting end of tube 30 is secured as by threads 34 to a mounting shank 36 which is attached to the rear wall of casing 10 as by threaded bolts (not shown). The end of mounting shank 36 includes external threads 38 for threadedly attaching the entire assembly through the wall of an appliance which is being temperature controlled.

As is illustrated in FIG. 1, the abnormal temperature sensor assembly, indicated generally at 40, includes a generally hollow cylindrical enclosure of good heat conducting material and defined by a inner cylindrical wall 42 joined by a bottom wall 44 to an outer cylindrical wall 46. The outer diameter of outer wall 42 is sized so that it is press fitted into the tube 36; thus, the entire length of wall 42 is in surface contact with the tube 30 to assure rapid heat transfer therebetween and to securely fix the assembly 40 in the tube 30. The inner cylindrical wall 42 defines a sleeve through which the rod 28 freely passes without contact therebetween.

Adjacent the circumferential joint between the bottom wall 44 and the outer wall 46, the enclosure is deformed to define an inner annular shoulder 48. Spaced upwardly from the annular shoulder 48, the outer cylindrical wall 46 has a plurality of spaced projections 50 which are deformations of the outer wall 46 and which cooperate with the annular shoulder 48 to define retainer means for the periphery of an annular bimetal snap disc 52. The annular disc 52 is a bimetal clicker that snaps over center in response to a designed temperature condition. A light insulating disc 54 is disposed adjacent the face of the bimetal disc 52 so as to prevent ground shorting of the switch contacts.

Figure 4:
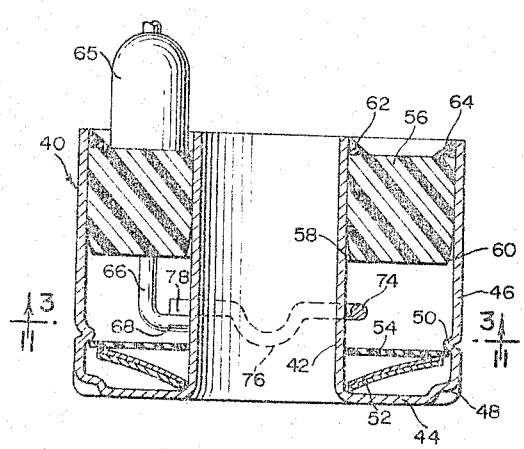
FIG. 4 is a cross-section taken along line 4—4 of FIG. 3.

As is shown in FIG. 4, the enclosure 40 defines a hollow annulus having one opened end which is sealed by a closure or cover 56 inserted in the opened end. The cover 56 is made of a dielectric material, such as a base polycarbonate resin, and has an annular configuration with inner and outer beveled edges 58 and 60, respectively, to facilitate its insertion into the enclosure 40. The annular cover 56 is sealed inside the annular enclosure 40 by a potting compound, such as epoxy resin, in the form of inner and outer sealing rings 62 and 64, respectively.

Figure 3:
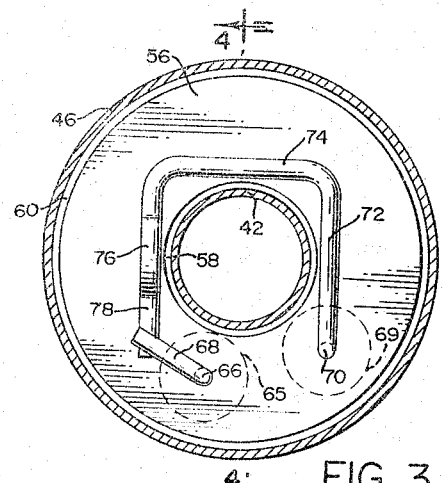
FIG. 3 is a cross-section of the thermostatic switch taken along line 3—3 of FIG. 4.
Figure 5:
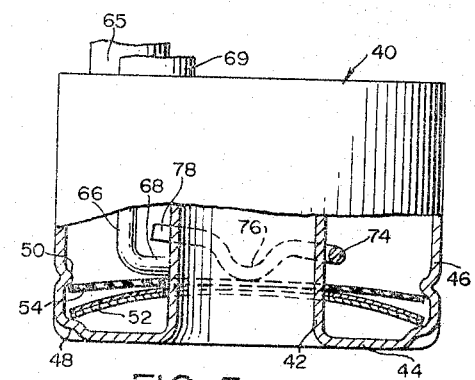
FIG. 5 is a partial cross-section similar to FIG. 4 but showing the switch in its open position.

The sealing rings 62 and 64 secure a lead wire holder 65 to the exterior of the cover annulus 56 whereby a lead wire 66, extending through the cover annulus 56 and holder 65, is securely fastened. The inner end of lead wire 66 is perpendicularly bent to define a fixed wire contact 68. A similar wire holder 69 securely fastens a second lead wire 70 which extends through the cover annulus 56 and has an inner end that is perpendicularly bent and formed into a generally U-shaped configuration. The first wire leg 72 of such U-shaped element extends from the lead wire 70 to an intermediate wire leg 74 that extends to the third wire leg having a deformed projection 76 and a terminal portion defining a movable wire contact 78. As is apparent in FIG. 3, the U-shaped element extends around the inner cylindrical wall 42 so that the movable wire contact 78 is disposed in mating relation with the fixed wire contact 68. The U-shaped element is inherently biased counterclockwise, as viewed in FIG. 5, about the juncture of lead wire 70 and the first wire leg 72 so that the movable wire contact 78 is normally biased into engagement with the fixed wire contact 68. Because of the U-shaped element, the wire holders 65 and 69 may be located adjacent each other and the lead wires 66 and 70 are located on the same side of the rod 28 (FIG. 1) when the enclosure 40 is assembled in the tube 30. Thus, the lead wires 66 and 70 do not interfere with the axial movement of the rod 28 is response to normal thermostatic cycling.

In operation of the present invention, it is to be understood that the control device 10 may be used in any type of system or appliance to control the operation heat exchanging apparatus such as heating systems, air-conditioning systems, hot water heater systems, etc. For example, with the temperature selection shaft 24 adjusted to a desired temperature to be maintained by the system, the first temperature sensor means defined by the rod 28 and tube 30 will cycle thermostatically in accordance with variations from the desired temperature; accordingly, the lever 18 and the operating button 16 will be correspondingly moved to activate and deactivate the normal temperature control 14. As long as the temperature maintained by the system does not exceed a predetermined amount that is deemed abnormal, the temperature control 14 is cycled normally while the abnormal temperature control 12 remains inactive.

While the abnormal temperature control 12 may be electrical or mechanical and may have a normal energized or deenergized state, for the purposes of description, it will suffice to define the control 12 as a safety device having supervisory control over the normal temperature control 14. Thus, the abnormal temperature control 12 may include an electrical operator which is serially connected to the free ends of lead wires 66 and 70 and which remains in an energized state as long as wire contacts 68 and 78 are closed.

If, for any reason, the normal temperature control 14 should fail to operate and the temperature maintained by the system exceeds an abnormal amount, the second temperature sensor means 40 will respond to such abnormal temperature condition. For example, the outer wall 46 of the enclosure, being in heat conductive relation with the tube 30, also has a heat transfer relationship with the bimetal snap disc 52. Accordingly, the abnormal temperature condition causes the bimetal snap disc 52 to snap from its position shown in FIG. 4 over center to its position shown in FIG. 5. The lead wire operator 76 which is deformed toward the bottom wall 44 is pushed upwardly as viewed in FIG. 5 by the insulator 54 which is pushed thereagainst by the bimetal snap disc 52. Such upward movement separates the movable wire contact 78 from the fixed wire contact 68 whereby the circuit for the abnormal temperature control 12 is opened and the system being controlled is shut down. As soon as the abnormal temperature condition is corrected, the abnormal temperature sensor will respond whereby the bimetal snap disc 52 will snap over center to its position shown in FIG. 4. The circuit for the abnormal temperature control 12 is again closed by the mated wire contacts 68 and 78; in certain installations, it may be desirable to provide the abnormal temperature control 12 with manual reset means so that the system must be restarted manually.

Inasmuch as the preferred embodiment of the present invention is subject to many variations, modifications and changes in detail, it is intended that all matter contained in the foregoing description or shown on the accompanying drawing shall be interpreted as illustrative and not in a limiting sense.

What is claimed is:

1. A thermal responsive device having dual temperature responsive means comprising
    first temperature sensor means including a tube of thermally expandable, heat conductive material and a rod of thermally non-expandable material longitudinally disposed in said tube in spaced relation thereto,
    said rod and tube having adjacent end portions secured together whereby said rod is moved longitudinally in response to expansion and contraction of said tube,
    second temperature sensor means including a hollow cylindrical enclosure having radially spaced inner and outer walls, a bottom wall joining adjacent ends of said walls and an annular insulating cover disposed between said walls at their other ends,
    said enclosure being disposed in space between said rod and tube with said outer wall in heat conductive relation with said tube and said inner wall defining a sleeve for free movement of said rod therethrough,
    switch means carried by said cover having one wire conductor with a bent portion defining fixed contact means and a second wire conductor with a bent extension defining movable contact means normally biased into engagement with said fixed contact means,
    bimetal snap means in said enclosure adjacent said bottom wall for operating said movable contact means in response to heat conduction between said tube and said enclosure.

2. The combination as recited in claim 1 wherein said bent extension comprises three unitary wire legs defining a generally U-shaped element extending partially around said inner wall, the third of said wire legs having a free end cooperating with said fixed contact means and having an intermediate portion deformed toward said bimetal snap means for actuation thereby.

3. The combination as recited in claim 2 wherein said bimetal snap means comprises an annuler snap disc and an insulator disc is disposed between the intermediate portion of the said third wire leg and said snap disc.

4. The combintion as recited in claim 3 wherein said wire conductors are disposed adjacent each other where are securely fastened thereto.

5. The combination as recited in claim 4 wherein said wire conductors are disposed adjacent each other where they extend through said insulator cover whereby said wire conductors are disposed on the same side of said rod when said enclosure is disposed in said tube.

No references cited.

BERNARD A. GILHEANY, *Primary Examiner.*

H. A. LEWITTER, *Assistant Examiner.*